US008367200B2

(12) United States Patent
Sato et al.

(10) Patent No.: US 8,367,200 B2
(45) Date of Patent: Feb. 5, 2013

(54) REFLECTING FILM EXCELLENT IN COHESION RESISTANCE AND SULFUR RESISTANCE

(75) Inventors: Toshiki Sato, Kobe (JP); Jun Suzuki, Kobe (JP); Shinichi Tanifuji, Kobe (JP); Takayuki Tsubota, Kobe (JP); Yoshinori Ito, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 790 days.

(21) Appl. No.: 11/962,942

(22) Filed: Dec. 21, 2007

(65) Prior Publication Data

US 2008/0171196 A1 Jul. 17, 2008

(30) Foreign Application Priority Data

Jan. 11, 2007 (JP) ................................ 2007-003710

(51) Int. Cl.
*B32B 15/00* (2006.01)

(52) U.S. Cl. ....................................... 428/336; 257/428

(58) Field of Classification Search ................... 428/336
See application file for complete search history.

(56) References Cited

U.S. PATENT DOCUMENTS

| | | | | |
|---|---|---|---|---|
| 5,548,440 | A | 8/1996 | Hohenegger et al. | |
| 6,520,650 | B2 * | 2/2003 | Fraizer | 359/514 |
| 2002/0196628 | A1 * | 12/2002 | Yoshida et al. | 362/296 |
| 2003/0048554 | A1 | 3/2003 | Gillich et al. | |
| 2003/0132537 | A1 * | 7/2003 | Inaba | 264/1.36 |
| 2004/0252627 | A1 * | 12/2004 | Ohta et al. | 369/288 |
| 2005/0202200 | A1 * | 9/2005 | Ohno et al. | 428/64.1 |
| 2005/0213467 | A1 * | 9/2005 | Noda et al. | 369/94 |
| 2006/0033993 | A1 * | 2/2006 | Sugino et al. | 359/487 |
| 2006/0068227 | A1 | 3/2006 | Ukishima et al. | |
| 2006/0098137 | A1 * | 5/2006 | Kameyama et al. | 349/96 |
| 2006/0154104 | A1 * | 7/2006 | Tauchi et al. | 428/673 |
| 2007/0034977 | A1 * | 2/2007 | Sasaki et al. | 257/428 |
| 2008/0199710 | A1 * | 8/2008 | Hosoda et al. | 428/461 |

FOREIGN PATENT DOCUMENTS

| | | | |
|---|---|---|---|
| DE | 200 13 791 | | 12/2000 |
| JP | 55-85646 | | 6/1980 |
| JP | 5-47251 | | 2/1993 |
| JP | 09-262927 | A | 10/1997 |
| JP | 2006-001271 | A | 1/2006 |
| JP | 2006-037169 | A | 2/2006 |
| WO | WO2006087956 | * | 8/2006 |

OTHER PUBLICATIONS

English Abstract of JP 03073431, Mar. 1991.*
Office Action issued Jul. 29, 2011, in German Patent Application No. 10 2008 003 446.0 (w/English translation).

* cited by examiner

*Primary Examiner* — D. Lawrence Tarazano
*Assistant Examiner* — Ronak Patel
(74) *Attorney, Agent, or Firm* — Oblon, Spivak, McClelland, Maier & Neustadt, L.L.P.

(57) ABSTRACT

A reflecting film including: an Ag or Ag-base alloy thin film of an Ag-base alloy containing at least one element among Au, Pt, Pd, Bi, and rare-earth elements as a first layer; a film of an oxide or oxynitride of at least one element among Si, Al and Ti having a thickness between 5 and 50 nm as a second layer deposited on the first layer; and a film having a thickness between 10 and 100 nm formed by a plasma polymerization process as a third layer deposited on the second layer.

18 Claims, 1 Drawing Sheet

REFLECTING FILM EXCELLENT IN COHESION RESISTANCE AND SULFUR RESISTANCE

BACKGROUND OF THE INVENTION

The present invention relates to a reflecting film excellent in cohesion resistance and sulfur resistance for lighting fixtures for the interior and exterior illumination of residential and office buildings or for headlamps for automobiles and trains.

Ag thin films or Ag-base alloy thin films have been used as reflecting films coating the inside surfaces of reflectors for lighting fixtures for the interior and exterior illumination of residential and office buildings or for headlamps for automobiles and trains. Ag thin films and Ag-base alloy thin films have high reflectance with visible light rays.

Ag is characterized by easy cohesion. Cohesion of Ag atoms reduces the reflectance of the reflecting film. The cohesion of Ag is caused by the adsorption of halogen ions and moisture contained in the atmosphere by the Ag and Ag-base alloy thin films. Therefore, Ag and Ag-base alloy thin films are coated with various resin thin films and coating films, respectively, to prevent the cohesion of Ag. However, the cohesion of Ag is caused often by halogen ions and moisture reaching the Ag and the Ag-base thin films through pinholes in the resin thin films and coating films. Cohesion of Ag forms innumerable white spots in the surfaces of Ag and Ag-base alloy thin films and causes color changes in Ag and Ag-base alloy thin films. Formation of white spots and color changes not only reduce reflectance but also spoils aesthetic appearance and deteriorate commercial value.

The reflecting film has a problem in addition to the problem of cohesion. The reflecting film is exposed to heat of high temperatures between 80 and 200° C. generated by a lamp when the lamp is lighted. Then, sulfur (S) contained in the atmosphere and diffused into the reflecting film reacts with the Ag of the reflecting film. Consequently, the surface of the reflecting film is sulfurated gradually and becomes dark and the reflectance of the reflecting film decreases.

Ag has been widely used as a material of electrical contacts and decorative films and the sulfur resistance of electrical contacts and decorative films has been improved by various methods including methods using alloys and those using multilayer films. For example, an Ag-base alloy disclosed in JP-A-55-85646 contains at least two elements among Pd, Au and Pt as additional element in a total content between 10 and 60 wt %. A multilayer film disclosed in JP-A-5-47251 has an Ag—Sn alloy base layer, and an Au or Au-base alloy thin film of a thickness between 10 and 200 nm deposited on the Ag—Sn alloy base layer. The Ag-base alloy and the multilayer film are excellent in sulfur resistance and are useful for forming electrical contacts and decorative films. However, the alloying elements contained in high alloying element contents and the Au thin film deposited on the surface of the Ag—Sn base layer reduces reflectance. Therefore, the Ag-base alloy is not suitable for forming the reflecting film and the multilayer film is unsuitable for use as a reflecting film.

SUMMARY OF THE INVENTION

According to the present invention that has been made with an intention to address the foregoing problems, it is desirable to provide a reflecting film excellent in cohesion resistance and sulfur resistance and coated with a substantially colorless, transparent protective film.

One aspect of the present invention is directed to a reflecting film excellent in cohesion resistance and sulfur resistance that includes: an Ag or Ag-base alloy thin film of an Ag-base alloy containing at least one element among Au, Pt, Pd, Bi, and rare-earth elements as a first layer; a film of an oxide or oxynitride of at least one element among Si, Al and Ti having a thickness between 5 and 50 nm as a second layer deposited on the first layer; and a film having a thickness between 10 and 100 nm formed by a plasma polymerization process as a third layer deposited on the second layer.

In the reflecting film according to the aspect, the thickness of the first layer may be 70 nm or above.

In the reflecting film according to the aspect, the film formed by the plasma polymerization process and forming the third layer may be a film of an organosilicon polymer.

The reflecting film according to the aspect is excellent in both cohesion resistance and sulfur resistance and has another advantage that the second and the third layer are substantially colorless, transparent protective films and are suitable for use as a reflecting film for lighting fixtures for the interior and exterior illumination of residential and office buildings or for headlamps for automobiles and trains.

DETAILED DESCRIPTION OF THE INVENTION

Figure 1:
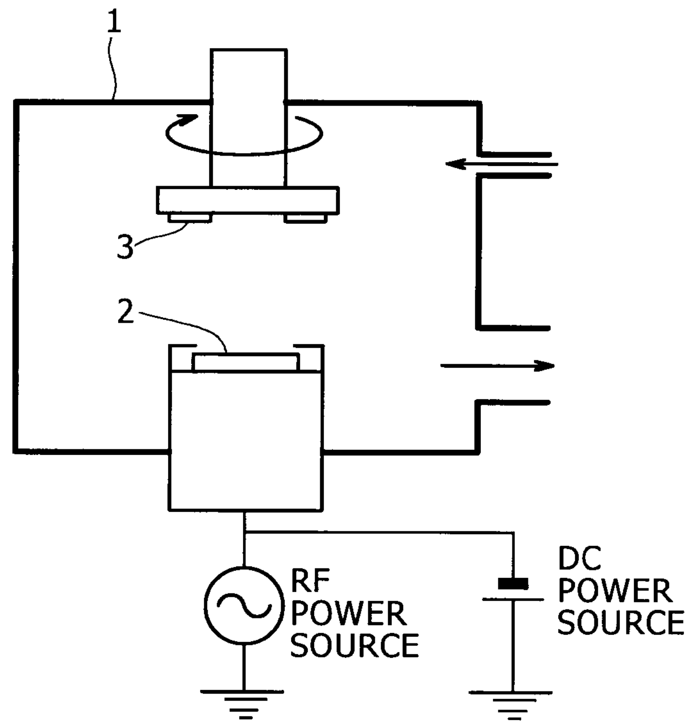
FIG. 1 is a schematic view of assistance in explaining film deposition by a sputtering system.

The present invention will be described in terms of preferred embodiments thereof.

The inventors of the present invention made studies diligently to solve the foregoing problems and found that salt and halogen elements, such as F, Cl and Br, contained in dust floating in the atmosphere are related with the cohesion of Ag atoms. If salt and dust deposit on the surface of an Ag or Ag-base alloy thin film, chemical interactions of halogen ions eluted from salt and dust, and Ag of the reflecting film take place. Consequently, a small amount of silver halide, such as AgCl, is produced on the surface of the thin film. The silver halide triggers the surface diffusion of Ag atoms causing the cohesion of Ag atoms.

Therefore, it is an effective means for preventing the cohesion of Ag atoms to prevent the adhesion of halogen elements to the surface of the Ag or Ag-base alloy thin film. The cohesion of Ag atoms in the Ag or Ag-base alloy thin film can be prevented by coating the surface of the Ag or Ag-base alloy thin film with a protective film not having any pinholes and impermeable to moisture.

Sulfuration of Ag is caused by the chemical interaction of Ag and sulfides, such as hydrogen sulfide, contained in the atmosphere and adhered to the surface of the Ag or Ag-base alloy thin film. The silver sulfide formed on the surface of the Ag or Ag-base alloy thin film changes the color of the surface of the Ag or Ag-base alloy thin film. Therefore, the surface of the Ag or Ag-base alloy thin film needs to be coated with a protective film capable of isolating the surface of the Ag or Ag-base alloy thin film from the atmosphere and not having any pinholes.

The surface of the Ag or Ag-base alloy thin film needs to be coated with the protective film to improve the cohesion resistance and sulfur resistance of the Ag or Ag-base alloy thin film. Since the Ag or Ag-base alloy thin film is intended for use as a reflecting film, the protective film needs to be substantially colorless and transparent. Films of metal oxides, such as Si, Al and Ti oxides, namely, silica ($SiO_x$), alumina ($AlO_x$) and titania ($TiO_x$), and films of oxynitride films formed by adding nitrogen to those oxide films are possible protective films meeting all the foregoing conditions.

Such a colorless, transparent protective film formed over the surface of the Ag or Ag-base alloy thin film inevitably has pinholes. For example, when the Ag or Ag-base alloy thin film coated with a protective film was held in an atmosphere of 50° C. and 90% RH in a thermo-hygrostat for a temperature-and-humidity controlled test, white spots were formed on the surface of the Ag or Ag-base alloy thin film. When the Ag or Ag-base alloy thin film coated with the protective film was exposed to hydrogen sulfide gas evaporated from a 5% ammonium sulfide solution for a sulfuration test, numerous brown spots were formed on the surface of the Ag or Ag-base alloy thin film.

Those protective films are inorganic films. A plasma-polymerized film formed by plasma polymerization is a possible organic film meeting all those conditions. The plasma-polymerized film has a high crosslinking density and it is difficult for pinholes to form in the plasma-polymerized film. A plasma-polymerized protective film of hexamethyldisiloxane having a thickness of 40 nm was formed on the surface of the Ag or Ag-base alloy thin film, and the Ag or Ag-base alloy thin film coated with the plasma-polymerized protective film was disposed above an ammonium sulfide solution. Although the color change of the Ag or Ag-base alloy thin film coated with the plasma-polymerized protective film was less conspicuous than that of an Ag or Ag-base alloy thin film not coated with any protective film, the entire surface of the Ag or Ag-base alloy thin film coated with the plasma-polymerized protective film was colored in light brown. Thus it was found that the single plasma-polymerized protective film could not completely prevent the sulfuration of the Ag or Ag-base alloy thin film.

Thus, even if a single substantially colorless, transparent protective film expected to be capable of meeting all the foregoing conditions including Ag-cohesion resistance and sulfur resistance is formed on the surface of the Ag or Ag-base alloy thin film, color change of the Ag or Ag-base alloy thin film due to Ag atom cohesion and sulfuration cannot be prevented.

The inventors of the present invention struck on an idea of forming a reflecting film by forming an Ag or Ag-base alloy thin film as a first layer, forming a film of an oxide or oxynitride of at least one element among Si, Al and Ti as a second layer on the first layer, and forming a plasma-polymerized film as a third layer on the second layer.

Since the cohesion of Ag atoms is caused by the penetration of halogen ions and moisture contained in the atmosphere through the protective film, the cohesion of Ag atoms in the first layer is prevented by preventing the penetration of halogen ions through the second layer, namely, a protective film, by suppressing the permeation of moisture through the second layer by coating the second layer with a water repellent plasma-polymerized film as the third layer, namely, a protective layer.

The three-layer reflecting film can suppress the permeation of a sulfur compound, such as hydrogen sulfide. The plasma-polymerized film formed on the second layer can reduce the amount of a sulfur compound reaching pinholes inevitably formed in the second layer and can improve the sulfur resistance of the reflecting film.

Desirably, the Ag or Ag-base alloy thin film forming the first layer has a thickness of 70 nm or above. The flux of light transmitted through the reflecting film is large and the flux of light reflected by the reflecting film is small if the thickness of the Ag or Ag-base alloy thin film is below 70 nm. Preferably, the thickness of the Ag or Ag-base alloy thin film is 100 nm or above, most desirably, 120 nm or above. The efficiency of reflection by the reflecting film saturate when the thickness of the Ag or Ag-base alloy thin film is increased beyond 300 nm. Therefore, the thickness may be 300 nm or below. Preferably, the thickness is 250 nm or below, most desirably, 200 nm or below.

The thickness of the second layer, namely, a film of the oxide or oxynitride of at least one element among Si, Al and Ti, needs to be between 5 and 50 nm. Other transparent oxide films, such as a tin oxide film ($SnO_2$ film) and zinc oxide film ($ZnO$ film) are not colorless and are yellowish. Such a colored film changes the color of light emitted by a light source. If the thickness of the oxide or oxynitride film is below 5 nm, the oxide or oxynitride film has excessively many pinholes and cannot stop sulfuration even if the plasma-polymerized film is formed thereon. Preferably, the thickness of the second layer is 10 nm or above. If the thickness is above 50 nm, high stress is induced in the oxide or oxynitride film and the oxide or oxynitride film comes off. Preferably, the thickness is 40 nm or below.

Desirably, the plasma-polymerized film forming the third layer is a film of an organosilicon polymer compound. Possible organosilicon polymer compounds are hexamethyldisiloxane, hexamethyldisilazane and triethoxysilane. Films of those organic compounds are water repellent and have very low wettability and hence can prevent the permeation of water.

The thickness of the plasma-polymerized film forming the third layer needs to be between 10 and 100 nm. When the thickness is below 10 nm, the plasma-polymerized film cannot exhibit sufficient barrier effect and cannot suppress the cohesion of Ag atoms and the sulfuration of Ag. Preferably, the thickness of the third layer is 15 nm or above. If the thickness is above 100 nm, high stress is induced in the plasma-polymerized film and the plasma-polymerized film comes off. Since the plasma-polymerized film is slightly yellowish, it is undesirable to form the plasma-polymerized film in an excessively big thickness. Preferably, the thickness is 80 nm or below.

The first layer of the reflecting film of the present invention maybe an Ag thin film. It is desirable that the first layer is an Ag-base alloy thin film containing at least one element among Au, Pt, Pd, Bi and rare-earth elements when the reflecting film is intended for use in a severe environment in which lighting fixtures for exterior illumination or headlamps for automobiles and trains are used. It is expected that the waterproofness and water repellency of the plasma-polymerized film deteriorate with time. The Ag-base alloy thin film excellent in cohesion resistance can maintain satisfactory cohesion resistance. Desirably, the first layer contains Au, Pt or Pd in a noble metal content between 0.3 and 4 at %. A noble metal content below 0.3 at % cannot improve cohesion resistance satisfactorily. A noble metal content above 4 at % reduces reflectance to visible radiation of low wavelengths and the reflecting film becomes yellowish, which is aesthetically undesirable. Preferably, the noble element content is in the range of 0.5 to 2 at %, more desirably, in the range of 0.7 to 1.5 at %. The reflecting film is satisfactory in cohesion resistance when Bi content and rare-earth element contents satisfied the following composition.

When an Ag thin film or an Ag-base alloy thin film containing a noble metal is used as a reflecting film for a high-power lamp, it is possible that heat generated by the lamp causes the cohesion of Ag atoms. Therefore it is preferable to add at least one element among Bi and rare-earth elements to the material forming the Ag thin film or the Ag-base thin film containing a noble metal in a content between 0.05 and 3.0 at % to prevent the cohesion of Ag atoms. Since the respective atomic radius of rare-earth elements are greater than that of Ag, the rare-earth element suppresses the diffusion of Ag atoms and the growth of crystal grains. Bi precipitates on the surfaces of Ag and reduces surface energy. Consequently, the cohesion of Ag atoms is suppressed.

Rare-earth elements are those of group 3A, such as Sc, Y, lanthanide 15 and actinide 15. One or two of more elements among the rare-earth elements may be used. The use of Nd and/or Y is most recommendable from the viewpoint of cost and industrial availability. The use of Ce and Sm is recommendable.

Rare-earth element and Bi are effective in suppressing the growth of crystal grains and the cohesion of Ag atoms caused by heat when the rare-earth element or Bi content is 0.05 at % or above. Although a desirable rare-earth element or Bi content is dependent on temperature to which the Ag or Ag-alloy thin film is exposed, a preferable rare-earth element or Bi content is 0.1 at % or above, desirably, 0.2 at % or above. The effect of the rare-earth element or Bi reaches a maximum and does not increase any further with the increase of the rare-earth element or Bi content beyond 3.0 at %. If the rare-earth element or Bi content is increased beyond 3.0 at %, the reflectance, particularly, the reflectance to visible radiation of short wavelengths decreases and the reflecting film becomes yellowish. A preferable rare-earth element or Bi content is 2.0 at % or below, more desirably, 1.0 at % or below.

EXAMPLES

Example 1

Referring to FIG. 1, a target 2 of pure Ag was placed in a processing chamber 1 of a sputtering system. A polycarbonate substrate 3 having a diameter of 50 mm and a thickness of 1 mm was disposed opposite to the target 2. The processing chamber 1 was evacuated at a vacuum of $1.3\times10^{-3}$ Pa as indicated by the outward arrow. Ar gas was supplied into the processing chamber 1 as indicated by the inward arrow and the processing chamber 1 was maintained at a pressure of $2.7\times10^{-1}$ Pa. A plasma was generated in the processing chamber by supplying dc power to the target 2. The target 2 of pure Ag was sputtered by supplying dc power of 100 W to the sputtering system to deposit a pure Ag thin film of 120 nm in thickness as a first layer on the surface of the polycarbonate substrate 3.

Subsequently, the target 2 of pure Ag was replaced with a target 2 of quartz glass, and then the processing chamber 1 was evacuated at a vacuum of $1.3\times10^{-3}$ Pa as indicated by the outward arrow. Ar gas was supplied into the processing chamber 1 as indicated by the inward arrow and the processing chamber 1 was maintained at a pressure of $2.7\times10^{-1}$ Pa. A plasma was generated in the processing chamber by supplying RF power to the target 2. The target 2 of quartz glass was sputtered for a predetermined time by supplying RF power of 200 W to the sputtering system to deposit a $SiO_x$ (x is 1 or 2) film as a second layer on the surface of the pure Ag thin film.

Figure 2:
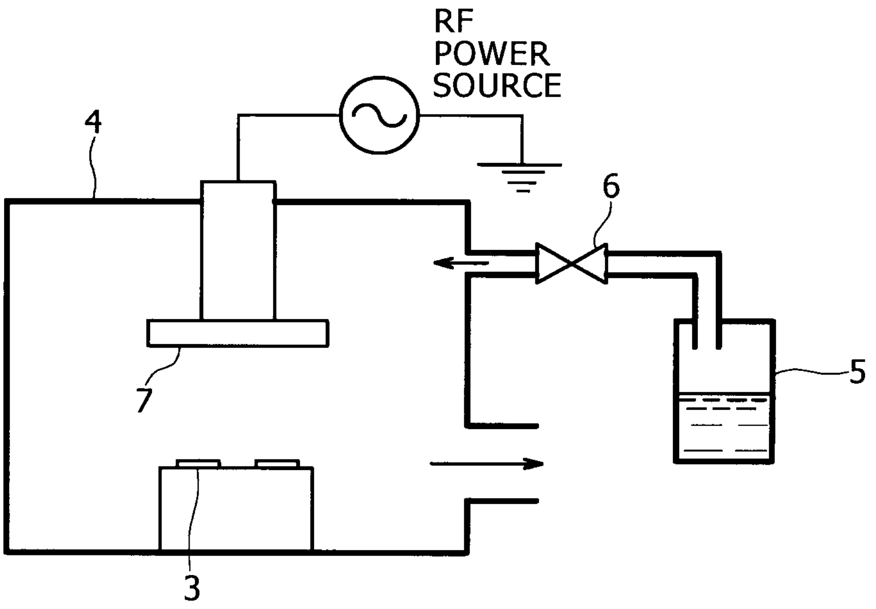
FIG. 2 is a schematic view of assistance in explaining film deposition by a plasma-polymerization system.

The substrate 3 was taken out of the processing chamber 1 of the sputtering system shown in FIG. 1, then, the substrate 3 was disposed in a processing chamber 4 of a plasma-polymerization system shown in FIG. 2. The processing chamber 4 was evacuated at a vacuum of $1.3\times10^{-3}$ Pa as indicated by the outward arrow. A needle valve 6 placed in a line connecting a bubbler 5 to the processing chamber 4 was opened to supply hexamethyldisiloxane vapor from the bubbler 5 into the processing chamber 4. The opening of the needle valve 6 was regulated to maintain the processing chamber 4 at 13 Pa, then, RF power was supplied to an upper electrode 7 placed in the processing chamber 4 and power of 200 W was used to generate a plasma in the processing chamber 4. Thus a plasma-polymerized film as a third layer was deposited on the surface of the $SiO_2$ film deposited on the substrate 3 disposed under the upper electrode 7.

Sputtering time of the quarts glass target 2 and plasma-polymerization time were changed to form $SiO_x$ films of different thicknesses and plasma-polymerized films of different thicknesses on the pure Ag thin films deposited on different substrates, respectively. Sample substrates provided with $SiO_x$ films of different thicknesses and plasma-polymerized films of different thicknesses, respectively, were subjected to a temperature-and-humidity controlled test and a sulfur resistance test.

The temperature-and-humidity controlled test held the sample at 50° C. and 95% RH for 240 hr. The sulfur resistance test held the sample above a 5% ammonium sulfide solution at a height of 3 cm from the surface of the ammonium sulfide solution for 60 min.

The surface of the sample was visually examined for the number of white spots and exfoliation after the temperature-and-humidity controlled test. The surface of the sample was photographed under an optical microscope at a 200× magnification after the sulfur resistance test. An area of 0.2 mm×0.2 mm of a photograph of the surface of the sample was examined for color change and the number of sulfide spots.

Test results are shown in Table 1. Cohesion of Ag atoms and exfoliation were not found after the temperature-and-humidity controlled test in Examples 1 to 8 each having the $SiO_x$ film and the plasma-polymerized film having thicknesses meeting conditions specified by the present invention. Only one sulfide spot was found in Example 1 after the temperature-and-humidity test. Data on the examples of the present invention showed that the properties of the examples of the present invention were satisfactory.

The thickness of the $SiO_x$ film of Comparative example 1 was smaller than the lower limit thickness specified by the present invention. Since the $SiO_2$ film of Comparative example 1 was excessively thin, change in the color of the entire surface of the reflecting film of Comparative example 1 was found after the sulfur resistance test. The thickness of the $SiO_x$ film of Comparative example 2 was greater than the upper limit thickness stated in claim 1. Since the $SiO_2$ film of Comparative example 2 was excessively thick, the surface of the reflecting film of Comparative example 2 came off after the temperature-and-humidity controlled test.

The thickness of the plasma-polymerized film of Comparative example 3 was smaller than the lower limit thickness specified by the present invention. Since the plasma-polymerized film of Comparative example 3 was excessively thin, white spots and sulfide spots were found on the surface of the reflecting film after the temperature-and-humidity controlled test and the sulfur resistance test, respectively. The thickness of the plasma-polymerized film of Comparative example 4 was greater than the upper limit thickness specified by the present invention. Since the plasma-polymerized film of Comparative example 4 was excessively thick, the surface of the reflecting surface came off after the temperature-and-humidity controlled test.

Comparative example 5 was not provided with any film corresponding to a plasma-polymerized film. White spots and sulfide spots were found on the surface of the reflecting film after the temperature-and-humidity controlled test and the sulfur resistance test, respectively. Comparative example 6 was not provided with any film corresponding to a $SiO_x$ film. Change in color of the entire surface was found after the sulfur resistance test.

It was ensured from the test results that a reflecting film provided with a $SiO_x$ film of a thickness between 0.5 and 50 nm and a plasma-polymerized film of a thickness between 10 and 100 nm is satisfactory in both cohesion resistance and sulfur resistance.

TABLE 1

| | thickness of $SiO_x$ film (nm) | thickness of plasma-polymerized film (nm) | Temperature-and-humidity controlled test (Number of white spots or exfoliation) | Sulfur resistance test (Number of sulfurated points or color change) |
|---|---|---|---|---|
| Example 1 | 7 | 40 | 0 | 1 |
| Example 2 | 10 | 10 | 0 | 0 |
| Example 3 | 10 | 20 | 0 | 0 |
| Example 4 | 10 | 50 | 0 | 0 |
| Example 5 | 10 | 75 | 0 | 0 |
| Example 6 | 15 | 95 | 0 | 0 |
| Example 7 | 20 | 40 | 0 | 0 |
| Example 8 | 45 | 15 | 0 | 0 |
| Comparative example 1 | 3 | 20 | 0 | Color change in entire surface |
| Comparative example 2 | 60 | 20 | Exfoliated | 0 |
| Comparative example 3 | 10 | 7 | 5 | 10 |
| Comparative example 4 | 20 | 110 | Exfoliated | 0 |
| Comparative example 5 | 10 | — | 7 | 12 |
| Comparative example 6 | — | 40 | 0 | Color change in entire surface |

Example 2

The sputtering system shown in FIG. 1 used for forming the reflecting films in Example 1 was used also for forming reflecting films in Example 2. An Ag-base alloy thin film and a protective film were deposited on a glass substrate. A target of an Ag-base alloy containing 0.5 at % Bi was used. Ag—Bi alloy films of 200 nm in thickness as a first layer were deposited on glass substrates. An $AlO_x$ film, a $TiO_x$ film, a $SnO_2$ film, and a ZnO film were deposited, as a second layer 20 nm in thickness, on the surfaces of the Ag—Bi alloy thin films by using an alumina target, a titania target, a tin oxide target and a zinc oxide target, respectively. A mixed gas containing three parts of Ar and one part of $N_2$ was supplied into the processing chamber shown in FIG. 1 and a SiON film of 20 nm in thickness was deposited on the surface of each Ag—Bi alloy thin film by using a quartz glass target under conditions similar to those for Example 1.

There is a tendency that the Bi content of a film is lower than that of a target, which is different from the tendency of other element content. The Bi content of the Ag—Bi alloy thin film was measured by ICP (Inductively Coupled Plasma) mass spectrometry. A glass substrate coated with the Ag—Bi alloy thin film was immersed in a nitric acid solution prepared by mixing one part by volume of 70% mass nitric acid and one part by volume of pure water to dissolve the Ag—Bi alloy thin film in the nitric acid solution. The Bi concentration of the solution obtained by dissolving the Ag—Bi alloy thin film in the nitric acid solution was measured by a mass spectrometer SP1-8000 (Seiko Instruments Inc.). The Bi content of the Ag—Bi alloy thin film was 0.21 at %.

The oxide films and the SiON films were visually examined. The $SnO_2$ and the ZnO film were yellow and were found to be not suitable for use as a protective film. The $AlO_x$, $TiO_x$ and SiON films meeting conditions stated in claim 1 were colorless.

A plasma-polymerized film of 30 nm in thickness as a third layer was deposited on the surfaces of the samples provided with the colorless $AlO_x$, $TiO_x$ and SiON films by a process similar to that used for obtaining the samples in Example 1 by using the plasma-polymerization system shown in FIG. 2 to obtain test samples. The samples were subjected to a sulfur resistance test and a temperature-and-humidity controlled test. Cohesion of Ag atoms, exfoliation and sulfuration were not found at all in any samples.

It was ensured from the test results that reflecting films respectively provided with the $AlO_x$, $TiO_x$ and SiON films of a thickness meeting predetermined thickness condition as the second layer instead of the $SiO_x$ film of Example 1 are satisfactory in both cohesion resistance and sulfur resistance.

Example 3

The sputtering system shown in FIG. 1 used for forming the reflecting films in Example 1 was used also for forming protective films on a glass substrate for Example 3. One of samples was provided with a pure Ag thin film of 100 nm in thickness as a first layer deposited by using a pure Ag target. The other sample was provided with an Ag—Bi—Nd alloy thin film of 100 nm in thickness as a first layer deposited by using an Ag—Bi—Nd target containing Ag, 0.5 at % Bi and 0.1 at % Nd. A $SiO_x$ film of 20 nm in thickness as a second layer was deposited. A plasma-polymerized film of 30 nm in thickness as a third layer was deposited by using the plasma-polymerization system shown in FIG. 2. The samples were subjected to a sulfur resistance test and a temperature-and-humidity controlled test. Cohesion of Ag atoms, exfoliation and sulfuration were not found at all in any samples. The Bi content of the Ag—Bi—Nd alloy thin film was measured by ICP mass spectrometry mentioned in connection with Example 2. The Bi content of the Ag—Bi—Nd alloy thin film was 0.20 at %.

The surfaces of both the samples were visually examined after holding the samples at 100° C. and 160° C. for 1000 h in a constant temperature furnace. Any color change was not found in the pure Ag thin film after being held at 100° C.

Slight color change was found in the surface of the pure Ag thin film after being held at 160° C., which proved that the cohesion of Ag atoms occurred. Any color change was not found at all in the surface of the Ag—Bi—Nd alloy thin film after being held at 100° C. and 160° C.

It was known from the foregoing test results that both the Ag thin film and the Ag-base alloy thin film containing at least one element among Au, Pt, Pd, Bi and rare-earth elements are satisfactory in both cohesion resistance and sulfur resistance. The Ag-base alloy thin film containing Bi or a rare-earth element is superior to the pure Ag thin film in cohesion resistance in a hot environment.

Example 4

In this example 4, the sputtering system (shown in FIG. 1) for forming the reflecting films in Example 1 was used for forming an Ag-base alloy thin film and a protective film on a polycarbonate substrate (ϕ50×1 mm). An Ag—Au alloy thin film of 150 nm in thickness containing Ag and 1 at % Au as a first layer was deposited on surfaces of four polycarbonate substrates by using an Ag—Au alloy target containing Ag and 1 at % Au. An Ag—Bi alloy thin film of 150 nm in thickness was deposited on surfaces of other four polycarbonate substrates by using an Ag—Bi alloy target containing Ag and 1 at % Bi. A $SiO_x$ film of 10 nm in thickness as a second layer was formed on the alloy thin films of the eight samples by using a quartz glass target. A plasma-polymerized film of 20 nm in thickness as a third layer was formed on the two samples among the four samples of each of groups each of the four samples by using hexamethyldisiloxane by the process mentioned above in connection with Example 1. The Bi content of the Ag—Bi alloy thin film was measured by the method mentioned above in connection with Example 2. The Bi content was 0.35 at %.

The samples provided with the plasma-polymerized film were subjected to a temperature-and-humidity controlled test and a sulfur resistance test as mentioned in connection with Example 1. The samples not provided with the plasma-polymerized film were subjected to a temperature-and-humidity controlled test as mentioned in connection with Example 1. The samples not provided with the plasma-polymerized film were intended to simulate a reflecting film deficient in the effect of the plasma-polymerized film on preventing the penetration of moisture and halogen ions.

Any white spots were not found in both the Ag—Au alloy thin film and the Ag—Bi alloy thin film not coated with the plasma-polymerized film after the temperature-and-humidity controlled test. It is expected from the result of the temperature-and-humidity controlled test that the cohesion resistance of the thin films containing the noble metal or Bi can be maintained even if the water repellency of the plasma-polymerized film deteriorates with time. Any white spots and sulfurated points were not found in the Ag—Au alloy thin films (containing Ag and 1 at % Au) and the Ag—Bi alloy thin films after the temperature-and-humidity controlled test and the sulfur resistance test, which proved that the Ag—Au alloy thin films and the Ag—Bi alloy thin films are satisfactory in both cohesion resistance and sulfur resistance.

The test results proved that the reflecting film is satisfactory in both cohesion resistance and sulfur resistance when the first layer is either of the Ag thin film and the Ag-base alloy thin film containing at least one element among Au, Pt, Pd, Bi and rare-earth elements.

What is claimed is:

1. A lighting fixture or headlamp having a reflecting film and a substrate coated with the reflecting film, said reflecting film comprising:

an Ag or Ag-base alloy thin film of an Ag-base alloy comprising at least one element among Au, Pt, Pd, Bi, and rare-earth elements as a first layer deposited on the substrate;

a film of an oxide or oxynitride of at least one element among Si, Al and Ti having a thickness between 5 and 50 nm formed by a sputtering process as a second layer deposited on the first layer; and a film having a thickness between 10 and 95 nm formed by a plasma polymerization process as a third layer deposited on the second layer wherein the film formed by the plasma polymerization process as the third layer is a film of an organosilicon polymer.

2. The lighting fixture or headlamp according to claim 1, wherein the thickness of the first layer is 70 nm or above.

3. The lighting fixture or headlamp according to claim 1, wherein the thickness of the third layer has a thickness of 10 nm to 80 nm.

4. The lighting fixture or headlamp according to claim 1, wherein said film of an oxide or oxynitride is a metal oxide film.

5. The lighting fixture or headlamp according to claim 4, wherein said metal oxide film comprises silica, alumina, and/or titania.

6. The lighting fixture or headlamp according to claim 1, wherein said film of an oxide or oxynitride is a metal oxynitride.

7. The lighting fixture or headlamp according to claim 1, wherein the thickness of the first layer is 100 nm or above.

8. The lighting fixture or headlamp according to claim 1, wherein the thickness of the first layer is 120 nm or above.

9. The lighting fixture or headlamp according to claim 1, wherein the thickness of the first layer is 300 nm or less.

10. The lighting fixture or headlamp according to claim 1, wherein the thickness of the first layer is 250 nm or less.

11. The lighting fixture or headlamp according to claim 1, wherein the thickness of the second layer is 10 nm to 40 nm.

12. The lighting fixture or headlamp according to claim 1, wherein the first layer comprises Au, Pt or Pd in a noble metal content between 0.3 and 4 at %.

13. The lighting fixture or headlamp according to claim 1, wherein the first layer comprises Au, Pt or Pd in a noble metal content between 0.5 and 2 at %.

14. The lighting fixture or headlamp according to claim 1, wherein the first layer comprises Au, Pt or Pd in a noble metal content between 0.7 and 1.5 at %.

15. The lighting fixture or headlamp according to claim 1, wherein the first layer comprises Bi and/or a rare-earth element.

16. The lighting fixture or headlamp according to claim 15, wherein the amount of Bi and/or a rare-earth element is 0.05 and 3.0 at %.

17. The lighting fixture or headlamp according to claim 1, wherein the thickness of the second layer is 45 nm or less.

18. The lighting fixture or headlamp according to claim 1, wherein the first layer is the film formed by a sputtering process.

* * * * *